Patented Feb. 10, 1925.

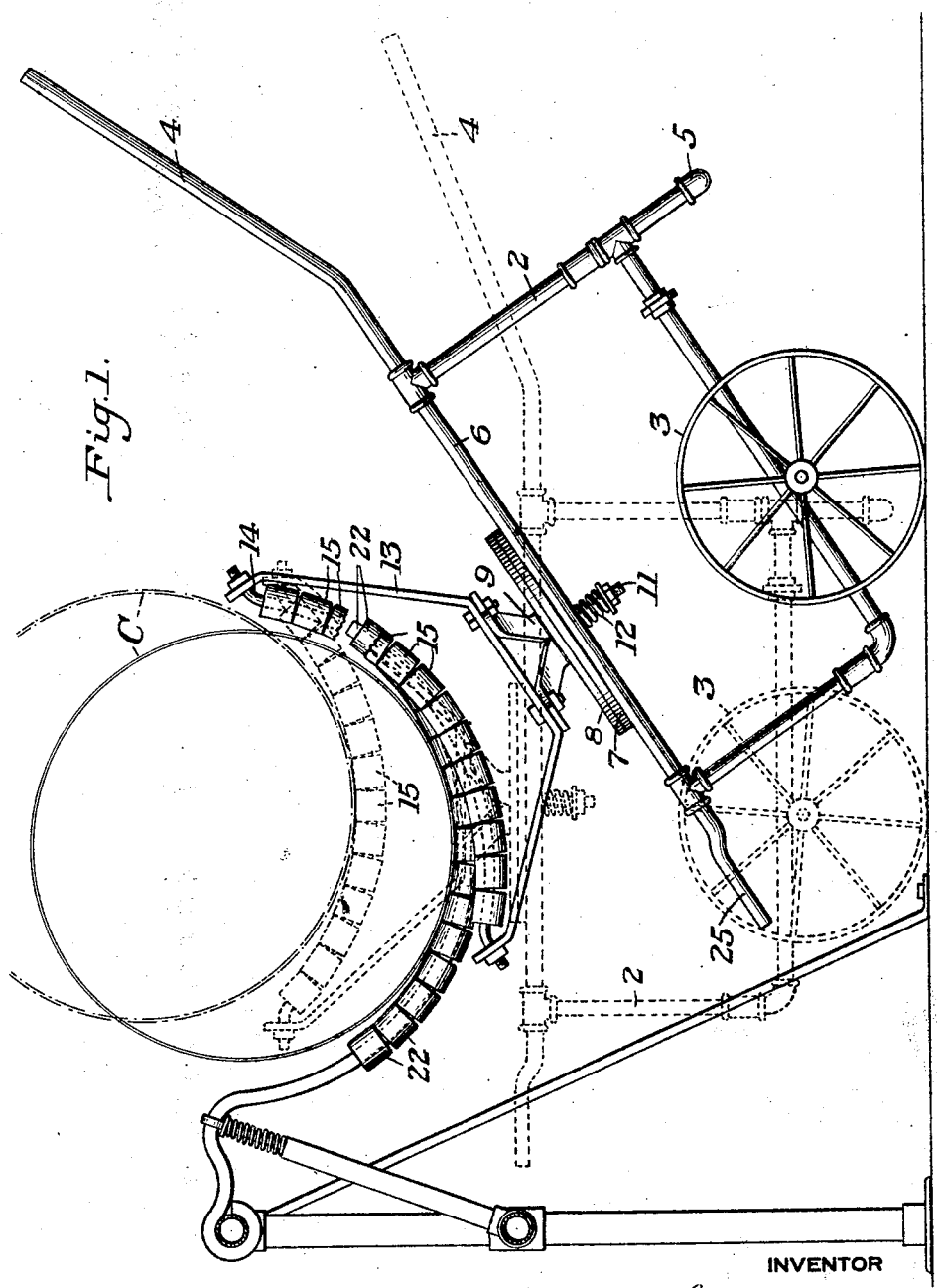

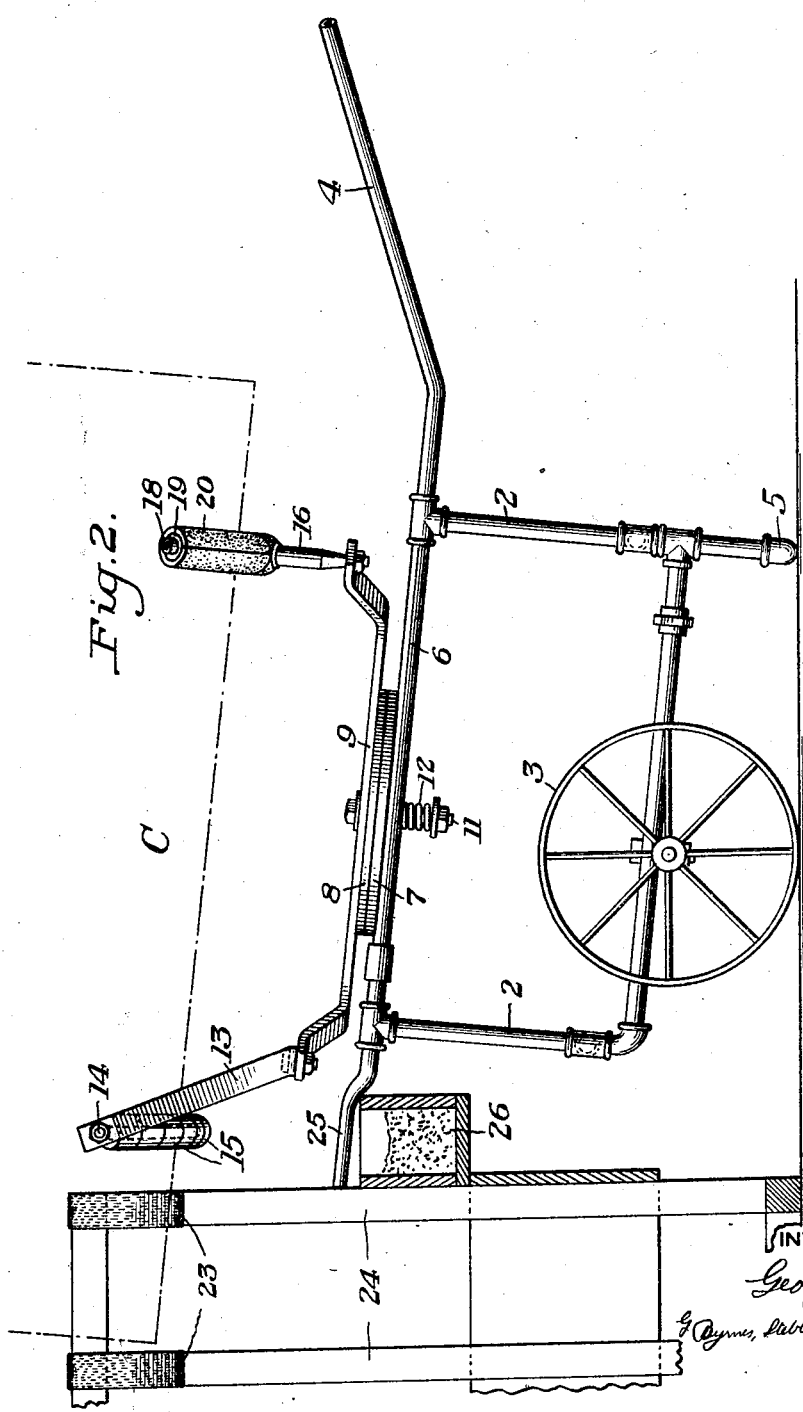

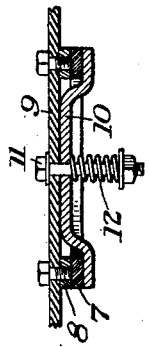
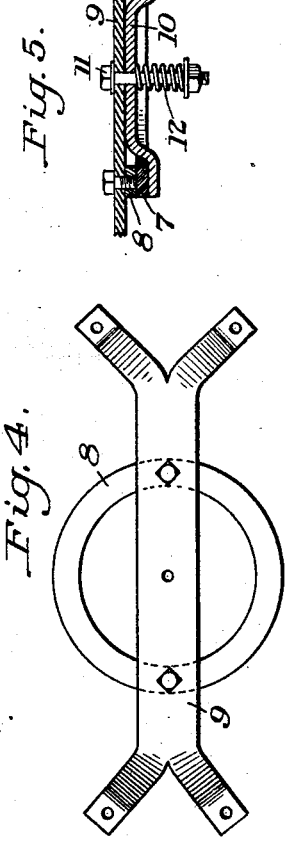
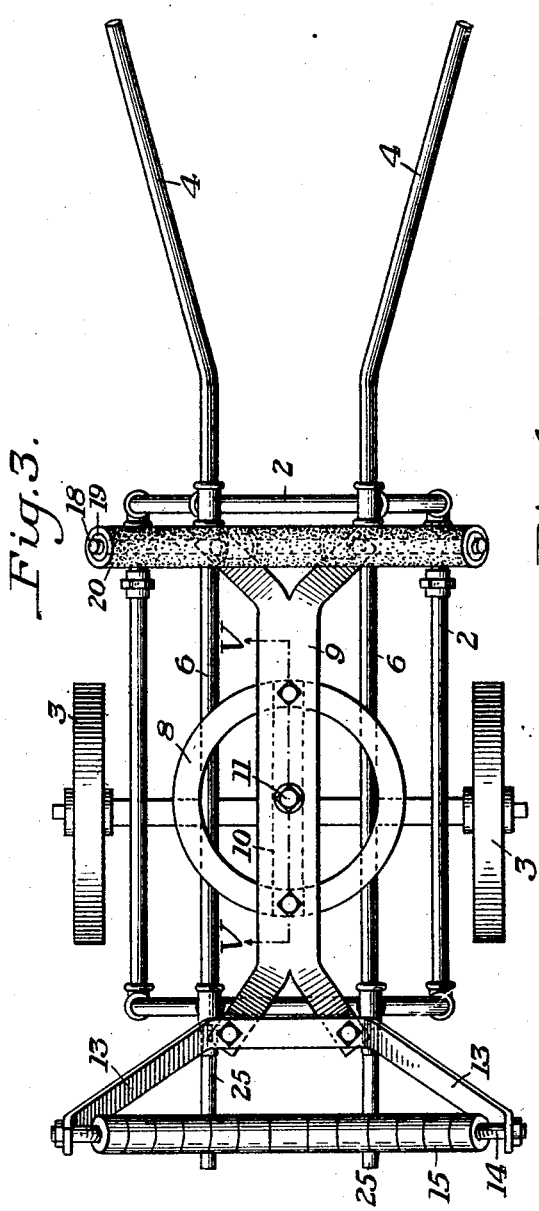

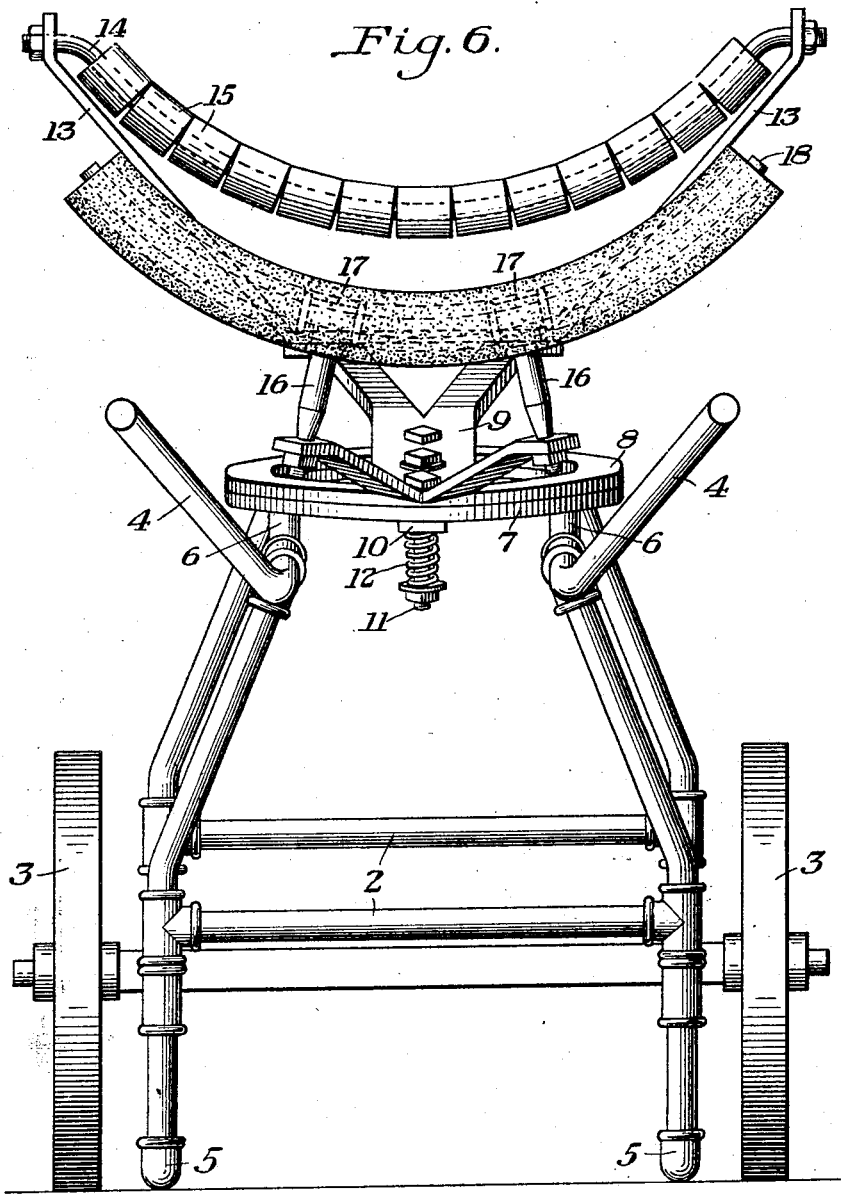

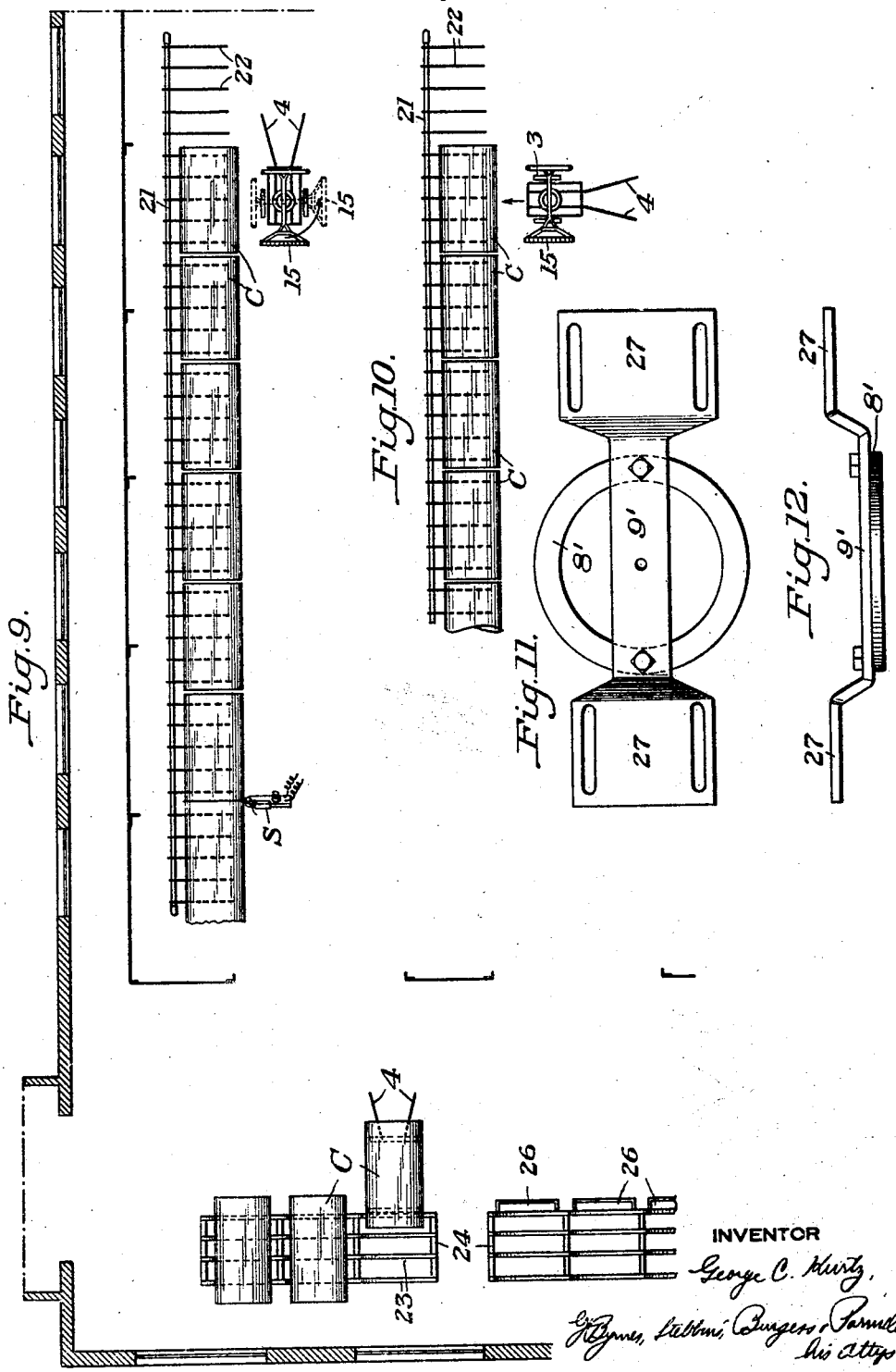

1,525,451

UNITED STATES PATENT OFFICE.

GEORGE C. KURTZ, OF JEANNETTE, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR TRANSFERRING CYLINDRICAL GLASS SECTIONS.

Application filed September 24, 1921. Serial No. 503,000.

*To all whom it may concern:*

Be it known that I, GEORGE C. KURTZ, a citizen of the United States, residing at Jeannette, in the county of Westmoreland and State of Pennsylvania, have invented a new and useful Improvement in Methods and Apparatus for Transferring Cylindrical Glass Sections.

Heretofore, after capping off machine-drawn glass cylinders on a supporting horse, the workmen have picked up the cut lengths by hand and carried them, usually on cloth supports, on their shoulders to the splitting buck, upon which they were then laid and split lengthwise one or more times. This is heavy and dangerous work, and moreover, often affects the quality of the glass, as well as resulting in some breakage. The perspiration passing through the clothing of the workmen and the cloth supports on their shoulders produces stains on the glass, which it is difficult if not impossible to remove. Also, when carried on the shoulders, the wet cloth supports sometimes set up sufficiently unequal temperatures and strains to cause bursting or shattering of the cylinder lengths.

My invention is designed to remove these and other troubles arising from such practice, and it consists in a simple and effective method and apparatus by which these steps may be carried out more easily, inexpensively and efficiently, with less breakage and a better resulting quality of glass.

In the drawings, in which there is illustrated a preferred embodiment of the apparatus:

Figure 1 is a side elevation of the transferring truck showing it in solid lines about to engage a cylindrical section on a capping horse and in dotted lines with the section supported thereon;

Figure 2 is a side elevation of the transferring truck in co-operative relation with a splitting buck;

Figure 3 is a top plan view of the transferring truck;

Figure 4 is a detail view of a portion of the turntable;

Figure 5 is a sectional view on the line V—V of Figure 3;

Figure 6 is an end elevation of the truck;

Figure 7 is a transverse sectional view through one of the supports on the truck;

Figure 8 is a transverse sectional view through the other support on the truck;

Figure 9 is a diagrammatic plan view representing the relationship between the capping horses and splitting bucks;

Figure 10 is a diagrammatic plan view of a portion of a capping horse illustrating the truck in position to be placed under a section supported thereon;

Figure 11 is a detail view of a modified form of turn table for the truck; and

Figure 12 is a side elevation of the construction illustrated in Figure 9.

Referring to the drawings, there is illustrated a transfer device in the form of a truck comprising a frame 2, of any desired construction, mounted on supporting and transferring wheels 3. The frame of the truck is preferably constructed of tubular sections to provide upwardly extending diverging handles 4 and floor-engaging rests 5. The center of gravity of the truck is so positioned that it normally assumes the horizontally inclined position shown in Figure 2, with the rests 5 in engagement with the floor. Secured to the longitudinally extending frame bars 6 is a lower supporting ring 7, constituting a part of the turn table for the truck. The above parts are in fixed relation to the wheels and handles. Co-operating with the ring 7 is an upper ring 8, having secured thereto a supporting bracket 9, formed with bifurcated end portions. Passing through the bracket 9 and engaging the upwardly bent diametrically extending bridging member 10 of the lower ring 7 is a king bolt 11, of such length that it may carry a compression spring 12, adapted to hold the rings 7 and 8 in close frictional engagement.

Extending upwardly from one end of the bracket 9 is a U-shaped member 13, having a downwardly curved rest rod 14, secured to the free ends thereof. On the rod 14 is mounted a plurality of independent rollers 15 of any desired material, adapted to form one of the supports for the glass cylinder C during transfer, as clearly shown in Figure 2. Extending upwardly from the bifurcated portions of the other end of the bracket 9 are arms 16, suitably secured thereto, through which passes a curved bar 18, corresponding generally to the curved rod 14, before described. This rod may have secured thereto a yielding inner covering 19. of leather or other suitable material encased within an outer covering 20 of rubber or the like. The parts of the truck are so proportioned that with the truck in its normal position, as before described, the supports formed by the rollers 15 and the yielding covering 20 will be in different horizontal planes, whereby a section of glass cylinder supported thereby is held in slightly inclined position. All of the parts carried by the upper ring 8 constitute the cylinder support, the position of which can be changed relative to the handles and wheels.

After a machine-drawn glass cylinder has been taken down, it is supported on a capping horse 21, only one form of which is shown in the drawings, having hanger or supporting arms 22. While so supported, it is capped off into lengths. This cutting into lengths may be effected by the use of a capping off stick S, having suitable electrical connections. The cut lengths or sections are slightly separated by moving them longitudinally on the capping horse and are then ready to be transferred to a splitting station.

I will now describe the preferred method of utilizing the transfer device in accordance with the present invention. The truck is brought alongside the glass section which it is desired to transfer, usually with the glass supports extending transversely of the truck wheels, and the supports are then turned at right angles to this position, as indicated in dotted lines in Figure 9. The entire truck is then swung around at right angles to its former position, as shown in Figure 10. The truck-supporting frame is then tilted by raising the handles 4, and pushed bodily under the desired cylinder section on the capping horse, as illustrated in full lines in Figure 1. Thereafter, the handles on the truck are depressed into the dotted line position shown in Figure 1, producing a relative movement between the truck and the horse which causes the cylinder to be lifted from the hanger arms. The truck with the cylinder section supported thereon is then pulled out a short distance to permit the turn table to be turned around to its original position. In this position, a workman stationed between the handles 4 moves the truck into such a position that the glass supports thereon are brought into substantial alignment with the straps 23 of a splitting buck 24 at the splitting station, as clearly shown in Figures 2 and 9. In order to insure proper positioning of the truck with relation to the splitting buck, it is preferably provided with projections 25, adapted to overlie the sawdust box 26 on the splitting buck. This maintains the truck in such a position relative to the straps 23 that the workman may place his gloved hands against the end of the glass cylinder on the truck without leaving his position between the handles, and shove the same endwise from the truck supports to the straps 23, the rollers 15 facilitating this operation, and the projections 25 preventing tipping of the truck.

It will be apparent that during the transfer of the glass cylinders they are supported at points spaced longitudinally thereof in a manner corresponding generally to the manner in which they are supported on the capping horses. This maintains the cylinder sections, which are not yet cool, in such manner that unbalanced or unsymmetrical strains are not produced therein during the transfer operation. At the same time, the glass is maintained out of contact with the workman, so that blemishes on the glass, such as result from perspiration, are avoided. By reason of the turn table construction on the truck, the truck with its cylinder may be manipulated through any of the confined areas within which the workmen must move at the present time, and the supports brought into proper position under the cylinder sections.

In order to permit the truck to be used with cylinders of various lengths, shorter than those which the truck heretofore described is adapted to handle, it may be constructed by securing to the upper ring 8' of the turn table a bracket 9' having slotted end portions 27, in which the bracket 13 and the arms 16 may be adjustably secured, as shown in Figures 11 and 12.

The transfer device or mechanism may be in the form of a telpher system or overhead trolley-supported carriers, for example, and many other changes may be made without departing from my invention as defined in the broader claims.

The advantages of the present invention arise from the method of avoiding the heavy and dangerous hand lifting and carrying and transferring the glass cylinders without producing unsymmetrical strains therein and without producing blemishes thereon.

Further advantages arise from the provision of means for effecting this transfer expeditiously within the confined working areas of the glass factories.

I claim:

1. The method of transferring severed cylindrical glass sections from a capping horse to a splitting station, comprising moving a transfer device under a section lying on the horse, transferring said section from the horse directly to the transfer device, moving the transfer device with the cylindrical glass section thereon to the splitting station, and then shoving the cylinder endwise on to a splitting buck at said station, substantially as described.

2. The method of transferring severed glass sections from a capping horse to a splitting buck, comprising moving a transfer device under a section lying on the horse, producing a relative movement between the transfer device and the horse for transferring said section from the horse directly to the transfer device, turning the section and moving the transfer device with the section thereon to bring the section in alignment with the buck supports, and then transferring the section from the transfer device to the buck supports by shoving the section endwise on to said supports, substantially as described.

3. A transfer mechanism for cylindrical glass sections, comprising a supporting frame, a turn table mounted thereon, cylinder section supports carried by said turn table, said supports being movable under a cylinder section on a capping horse, and means for raising and lowering said frame to remove a section from a capping horse, substantially as described.

4. A transfer mechanism for cylindrical glass sections, comprising a supporting frame, a turn table mounted thereon, cylinder section supports carried by said turn table, said supports being movable under a cylinder section on a capping horse, means for raising and lowering said frame to remove a section from a capping horse, and carrying means for said frame to permit the same with a section thereon to be moved as desired, substantially as described.

5. The method of transferring severed cylindrical glass sections from a capping horse to a splitting buck which includes moving a wheeled carriage having glass supporting means adjacent a section to be transferred as it lies on the capping horse, causing upward movement of the glass supporting means to lift the section from the capping horse and leave it supported on the transfer device, wheeling the carriage adjacent the splitting buck and transferring the section to the splitting buck, the section during the entire transfer being maintained out of supporting contact with the operator, substantially as described.

6. A transfer mechanism for cylindrical glass sections comprising a wheeled carriage having a handle, and glass supporting means adapted to be moved into contact with a cylindrical glass section, the glass supporting means being adapted for upward movement to lift the section upon downward movement of the handle, substantially as described.

7. A transfer mechanism for cylindrical glass sections comprising a wheeled carriage having a handle, and glass supporting means adapted to be moved into contact with a cylindrical glass section, the glass supporting means being adapted for upward movement to lift the section upon downward movement of the handle, the glass supporting means being made of a material which is a poor conductor of heat, substantially as described.

8. A transfer mechanism for cylindrical glass sections, comprising a wheeled carriage, a turn table mounted on the carriage, said turn table carrying a plurality of glass supporting means adapted to engage a glass cylinder, and handles on the carriage, substantially as described.

9. Glass making apparatus, including a capping horse for supporting severed glass cylinders, a splitting buck, a wheeled carriage movable between the capping horse and the splitting buck adapted to be moved alongside the horse, glass supporting means on the carriage, and a handle for the carriage, the glass supporting means being adapted for movement into supporting engagement with the cylinder and for lifting the cylinder out of supporting engagement with the horse upon movement of the handle, substantially as described.

10. Glass making apparatus, including a capping horse for supporting severed glass cylinders, a splitting buck, a wheeled carriage movable between the capping horse and the splitting buck adapted to be moved alongside the horse, glass supporting means on the carriage, a handle for the carriage, the glass supporting means being adapted for movement into supporting engagement with the cylinder and for leaving the cylinder out of supporting engagement with the horse upon movement of the handle, and means for relatively positioning the carriage and the splitting buck to facilitate transfer of the glass section from the transfer device to the splitting buck, substantially as described.

11. The method of transferring severed cylindrical glass sections from a capping horse to a splitting buck, which includes bringing a supporting means into engagement with the section as it lies upon the capping horse, said supporting means having rotatable portions in engagement with the glass, moving the supporting means adjacent the splitting buck and moving the cylinder endwise over the rotatable supporting means onto the splitting buck, substantially as described.

12. In a system for handling blown glass cylinders, a capping horse and a splitting station, and glass-handling apparatus comprising a transfer device movable in any direction at will and arranged to mechanically lift the sections from the capping horse for transfer to the splitting station, substantially as described.

In testimony whereof I have hereunto set my hand.

GEORGE C. KURTZ.